United States Patent Office 3,192,233
Patented June 29, 1965

3,192,233
SELECTIVE OXIDATION OF ACROLEIN DIMER
William G. Skelly, Northbrook, Ill., assignor to International Minerals & Chemical Corporation, a corporation of New York
No Drawing. Filed Oct. 20, 1961, Ser. No. 146,421
6 Claims. (Cl. 260—343.5)

The present invention relates to the selective oxidation of acrolein dimer. In one of its aspects the present invention is directed to the oxidation of acrolein dimer to provide alpha-hydroxyglutaric acid or its lactone. In still another of its aspects the present invention is directed to the conversion of acrolein dimer to pyrrolidonecarboxylic acid or to glutamic acid.

Acrolein dimer has been recognized in the art as an appropriate starting material for the production of alpha-hydroxyglutaric acid, the lactone thereof, and also for the subsequent preparation of pyrrolidonecarboxylic acid and glutamic acid. For example, Kodras U.S. Patent 2,897,209 discloses a process wherein acrolein dimer is ozonized and the ozonization product then is subjected to cleavage and oxidation to provide alpha-hydroxyglutaric acid lactone. The lactone may be reacted further with ammonia to provide pyrrolidonecarboxylic acid or glutamic acid according to Purvis U.S. Patent 2,837,532. It will be apparent that in the process of Kodras 2,897,209 the olefinic unsaturation of the dimer is first attacked by ozone and thereafter the ozonide is cleaved and the aldehyde groups are oxidized to carboxylate groups.

In an alternate process described in Kodras U.S. Patent 2,904,555, acrolein dimer is first oxidized to 3,4-dihydro-1,2-pyran-2-carboxylic acid and this compound thereafter is ozonized in an aqueous medium. Following ozonization, the medium is cleaved in an acidic medium and oxidized to provide alpha-hydroxyglutaric acid lactone. The alpha-hydroxyglutaric acid lactone may be further reacted with ammonia to provide pyrrolidonecarboxylic acid or glutamic acid again according to Purvis U.S. Patent 2,837,532. In the process of Kodras 2,904,555 the aldehyde group of the acrolein dimer is first oxidized to a carboxylate group and ozonization and cleavage thereafter is effected.

It is a primary object of this invention to provide a simplified process for the selective oxidation of acrolein dimer to alpha-hydroxyglutaric acid or its lactone.

It is a further object of this invention to provide a simplified process for the selective oxidation of acrolein dimer to alpha-hydroxyglutaric acid or its lactone which is effected in an aqueous medium.

It is an additional object of this invention to provide a simplified process for the conversion of acrolein dimer to pyrrolidonecarboxylic acid.

It is yet another object of this invention to provide a simplified process for the conversion of acrolein dimer to glutamic acid.

According to this invention there is provided a process which comprises reacting molecular oxygen and ozone with acrolein dimer in an aqueous medium in the presence of a catalyst selected from the group consisting of (a) metallic silver and (b) silver oxide supported on a base metal oxide, said reaction being carried out at a pH above about 7.

In one embodiment of the invention the ozone and the molecular oxygen are reacted with acrolein dimer simultaneously to form an hydroxyglutarate. In another embodiment of the invention molecular oxygen is first reacted with the acrolein dimer and subsequently a mixture of ozone and molecular oxygen is reacted with the intermediate (3,4-dihydro-1,2-pyran-2-carboxylate). The catalyst is not removed from the medium during the secondary oxidation and, accordingly, the present invention provides an efficient means for the selective oxidation of acrolein dimer.

The practice of the present invention permits the conversion of acrolein dimer to hydroxyglutaric acid or the lactone thereof in an efficient manner. The processing of this invention includes an oxidation of the acrolein dimer aldehyde group to a carboxylate group, the addition of ozone across the double bond of the acrolein dimer ring, a cleavage of the ozonization product, and finally an oxidation of any aldehyde groups formed in said cleavage to carboxylate groups. Despite the multiplicity of reactions which are accomplished, the present invention does not require extensive processing of the reaction medium. Indeed, the entire series of reactions can be carried out substantially simultaneously. Not only does the practice of the present invention permit a more facile processing to be accomplished, but it also is capable of providing high yields than, for example, the processing described in Kodras Patents 2,897,209 and 2,904,555. Still further, the process of the present invention employs readily available molecular oxygen as contrasted to less economical materials such as the hydrogen peroxide that provided the highest yields in the Kodras processes.

The catalyst which may be employed in the practice of this invention is selected from the group consisting of (a) metallic silver and (b) silver oxide supported on a base metal oxide.

The utilization of metallic silver to oxidize acrolein dimer to 2,3-dihydro-1,4-pyran-2-carboxylic acid (3,4-dihydro-1,2-pyran-2-carboxylic acid) is disclosed in Montagna et al. U.S. Patent 2,930,801. The catalyst may be employed in the present process in a concentration of at least about 1% and preferably at least about 3% of the reaction mixture. A particularly preferred range for the catalyst is from about 3% to about 10% by weight. While increased catalyst concentrations tend to affect the economics of the process adversely, the reaction is operable at catalyst concentrations above about 10%.

The silver oxide supported on a base metal oxide contemplated by the present invention is described in Kodras 2,904,555 and in Norman co-pending application Serial No. 756,303, filed August 21, 1958, now Patent No. 3,122,566. Suitable base metal oxides include the oxides of iron, nickel, cobalt, antimony, and titanium. Since from the standpoint of economics it is desirable to avoid excessive proportions of the silver oxide, silver oxide desirably constitutes from about 1% to about 15% of the composite catalyst. Preferably silver oxide constitutes from about 1% to about 5% of the composite catalyst. A particularly preferred catalyst constitutes silver supported on ferric oxide ($Fe_2O_3$).

These catalysts may be employed in any desired concentration and in a batch process desirably from about 0.5% to about 20% by weight based on the weight of the reaction medium. Preferred amounts of catalyst in a batch process will constitute from about 0.5% to about 5% by weight of the reaction medium.

The catalyst preparation is conveniently carried out by dissolving appropriate salts of silver and the base metal in water, precipitating the metals in the form of the hydroxides, carbonates, basic carbonates, or other derivatives readily convertible to the oxides, washing free of soluble materials, then calcining or otherwise treating as required to produce the desired oxide mixture. In another method, the base metal oxide is impregnated with a solution of a suitable salt of silver, and the impregnated oxide is treated as necessary to produce silver oxide. Numerous other preparation techniques are described in the art.

As indicated earlier the reaction medium will contain water as an inert solvent, a suitable base, and acrolein dimer. The base employed for the reaction medium is not critical and may constitute, for example, an alkali metal hydroxide, an alkali metal carbonate, an alkaline earth metal hydroxide or the like. Sodium hydroxide and potassium hydroxide constitute preferred bases for the practice of this invention.

The concentration of acrolein dimer in the reaction medium will be a matter of choice depending upon process conditions employed. While acrolein dimer proportions of 25% or above may be employed, excessive foaming may be encountered at higher concentrations. Accordingly, concentrations of 15% or less and at times from 3% to 5% may be preferred.

The reaction may be carried out at atmospheric or at superatmospheric pressure and at temperatures broadly between about 0° C. and about 100° C. Since higher temperatures often do not provide any significant advantage, it is preferred to conduct the reaction at a temperature from about 10° C. to about 40° C.

The molecular oxygen may be supplied to the reaction as pure molecular oxygen or as a gas containing molecular oxygen such as air. Similarly, the ozone may be supplied as a gas containing ozone. It has been found that ozone concentrations as low as about 1% are effective to accomplish the reaction of this invention. Higher ozone concentrations, of course, are also within the contemplation of this invention.

The reaction is conducted at a pH of at least about 7. The metallic silver catalyst appears to provide the best results at a pH above about 12.5. For the metallic silver catalyst, both the oxidation and ozonization appear to be accomplished with the greatest efficiencies at high pH's. In the event that oxygen and ozone are to be reacted simultaneously with the mixture in the presence of silver oxide supported on a base metal oxide, it is desirable to maintain the pH of the medium above about 9 and preferably above about 11. If molecular oxygen first is reacted with the mixture and molecular oxygen and ozone subsequently are reacted with the mixture, the pH for the oxidation can be regulated at any level above 7 with pH's between about 7 and about 9 providing excellent results for this reaction. The subsequent ozonization reaction, however, is desirably conducted at a pH above 9 and most desirably at a pH above 11. The regulation of the pH levels can be accomplished by any of the means well known to the art.

The time of the reaction will vary widely depending upon the concentration of the catalyst, the proportions of the reaction medium, the concentration of the ozone and the like.

In order to avoid polymerization of the acrolein dimer, it is desirable to add the dimer incrementally to the reaction. Thus, for example, a catalyst slurry may be prepared and the acrolein dimer and alkaline material can be added simultaneously throughout the reaction. Alternately, a catalyst slurry can be prepared containing the total required alkaline material and the acrolein dimer can be added to this medium incrementally throughout the reaction period. The use of polymerization inhibitors is also within the contemplation of this invention. Such inhibitors are well known to the art and are described, inter alia, in U.S. Patent 2,562,848.

The above-described reaction will provide alpha-hydroxyglutarate in excellent yields. If desired, the alpha-hydroxyglutarate can be isolated from the medium employing methods well known to the art. Alternately the medium can be acidified to a pH less than about 7 and preferably less than about 4 with an acid such as hydrochloric acid, sulfuric acid, phosphoric acid, formic acid, acetic acid or the like to form the hydroxyglutaric acid lactone. The lactone then can be isolated from the medium employing methods well known to the art. It will be apparent that in either of the above alternates the catalyst is removed from the medium before the reaction product is isolated.

In order to form pyrrolidonecarboxylate either the alpha-hydroxyglutarate or the alpha-hydroxyglutaric acid lactone may be reacted with ammonia at a temperature above 200° C. and preferably above 250° C. for a time varying from about 0.5 to about 30 hours and preferably from about 3 to about 8 hours. Such reaction is described in Purvis U.S. Patent 2,837,532. The pyrrolidonecarboxylate can then be hydrolyzed either with a strong mineral acid or with a strong base to provide glutamic acid. Hydrolysis is well known to the art and will not be described further here.

In one preferred embodiment of this invention, acrolein dimer is reacted with molecular oxygen in an aqueous medium in the presence of a silver oxide catalyst supported on a base metal oxide at a pH between about 7 and about 9, and is subsequently reacted with ozone and molecular oxygen at a pH above 9 and preferably about 11 to provide alpha-hydroxyglutarate. The catalyst is removed from the medium, the medium is acidified to a pH less than about 7 and preferably less than about 4 to form the alpha-hydroxyglutaric acid lactone, and the lactone is reacted with ammonia at a temperature above 200° C. and preferably above 250° C. to form pyrrolidonecarboxylate. The carboxylate then in hydrolyzed to form lutamic acid.

While the above process is described primarily as a batch operation, it will be apparent that it can also be accomplished as a continuous process.

The following examples are included for illustrative purposes only and in no way are intended to limit the scope of the invention.

Example I

A slurry was prepared containing 32 grams of a ferric oxide-silver oxide catalyst (1.06% silver oxide) in 700 ml. of water. Twenty-eight grams of freshly distilled acrolein dimer were added to the stirred suspension dropwise over a period of one hour. During the hour the suspension was continuously agitated, the pH was maintained at about 12.5 as indicated on a Leeds-Northrup Electronic pH Controller-Recorder and a mixture of molecular oxygen containing approximately 3%–4% ozone was added to the reaction mixture at the rate of .033 cubic foot per minute. The temperature of the reaction mixture was maintained at 25–30° C. and the oxygen-ozone addition was carried on for a total period of 3 hours and 5 minutes. The total quantity of 20% sodium hydroxide required to maintain the pH during the reaction was 130 ml.

At the end of the reaction the catalyst was filtered from the medium and the resulting clear water-white solution was characterized by a pH of 11.5. The pH was then adjusted with 14.45 ml. of concentrated sulfuric acid to pH 3.7.

An aliquot of 240 ml. (20% of the 1200 ml. total volume) was treated with 6 ml. ammonium hydroxide, evaporated, ammoniated with 60 ml. of ammonium hydroxide at 250° C. for 5 hours, evaporated, hydrolyzed wtih 90 ml. of 20% hydrochloric acid for 4 hours at reflux, and finally evaporated to dryness. The residue was dissolved in 100 ml. of water. Analysis indicated the presence of 25.9 mg. per ml. of L-glutamic acid. This is equivalent to 5.18 grams of D,L-glutamic acid or a 70.5% yield based on the acrolein dimer starting material. The analysis employed to determine the presence of glutamic acid was the method described in Agricultural and Food Chemistry, vol. 5, No. 6, page 448, June 1957.

Example II

A slurry was prepared containing 32 grams of ferric oxide-silver oxide catalyst (1% silver oxide) in 700 ml. of water. Twenty-eight grams of freshly distilled acrolein dimer were added to the stirred suspension drop-wise over a period of 1¼ hours. During the 1¼ hours the suspension was continuously agitated, the pH was maintained at about 12 as indicated on a Leeds-Northrup Electronic pH Controller-Recorder and molecular oxygen was added at a rate of .034 cubic foot per minute. The pH Controller-Recorder was then set for pH 12.5 and a mixture of molecular oxygen containing about 4% ozone was added for 3¾ hours. The temperature was maintained at 15–30° C. The total quantity of 20% sodium hydroxide required to maintain the pH during the reaction was 130 ml.

At the end of the reaction the catalyst was filtered from the medium and the resulting clear water-white solution was characterized by a pH of 11.3. The pH was then adjusted with 14.0 ml. of concentrated sulfuric acid to pH 3.65.

An aliquot of 250 ml. (20% of the 1200 ml. total volume) was treated with 6 ml. ammonium hydroxide, evaporated, ammoniated with 60 ml. of ammonium hydroxide at 250° C. for 5 hours, evaporated, hydrolyzed with 90 ml. of 20% hydrochloric acid for 4 hours at reflux, and finally evaporated to dryness. The residue was dissolved in 100 ml. of water. Analysis indicated the presence of 30.7 mg. per ml. of L-glutamic acid. This is equivalent to 6.14 grams of D,L-glutamic acid or an 83.54% yield based on the acrolein dimer starting material.

Since modifications will be apparent to one skilled in the art, it is intended that the invention be limited only by the appended claims.

I claim:

1. A process for the selective oxidation of acrolein dimer to alpha-hydroxyglutarate which comprises reacting molecular oxygen and ozone with acrolein dimer in an aqueous medium in the presence of a catalyst selected from the group consisting of (a) metallic silver and (b) silver oxide supported on a base metal oxide, said reaction being carried out at a pH above about 7.

2. The process of claim 1 wherein the molecular oxygen and ozone are simultaneously reacted with the acrolein dimer.

3. The process of claim 1 wherein the hydroxy-glutarate is acidified to a pH below about 7 to form hydroxy-glutaric acid lactone.

4. A process for the selective oxidation of acrolein dimer to alpha-hydroxyglutarate which comprises reacting molecular oxygen and ozone wtih acrolein dimer in an aqueous medium in the presence of a catalyst consisting essentially of silver oxide supported on ferric oxide, said reaction being carried out at a pH about 7.

5. The process of claim 4 wherein the molecular oxygen and ozone are simultaneously reacted with the acrolein dimer at a pH above about 9.

6. The process of claim 4 wherein reaction with molecular oxygen is effected at a pH from about 7 to about 9 and, subsequently, reaction with ozone and molecular oxygen is effected at a pH above about 11.

References Cited by the Examiner

UNITED STATES PATENTS

| | | | |
|---|---|---|---|
| 2,764,612 | 9/56 | Weidman | 260—534 |
| 2,790,001 | 4/57 | Purvis | 260—534 |
| 2,837,532 | 6/58 | Purvis | 260—326.3 |
| 2,852,530 | 9/58 | Ford | 260—343.6 |
| 2,897,209 | 7/59 | Kodras | 260—326.3 |
| 2,904,555 | 9/59 | Kodras | 260—326.3 |
| 2,995,602 | 8/61 | Kawai et al. | 260—326.3 |
| 3,002,978 | 10/61 | Bocher | 260—326.3 |

IRVING MARCUS, *Primary Examiner.*

DUVAL T. McCUTCHEN, NICHOLAS S. RIZZO,
*Examiners.*

UNITED STATES PATENT OFFICE
CERTIFICATE OF CORRECTION

Patent No. 3,192,233

June 29, 1965

William G. Skelly

It is hereby certified that error appears in the above numbered patent requiring correction and that the said Letters Patent should read as corrected below.

Column 2, line 18, for "high" read -- higher --; line 50, after "silver" insert -- oxide --; column 4, line 23, for "in" read -- is --.

Signed and sealed this 18th day of January 1966.

(SEAL)
Attest:

ERNEST W. SWIDER
Attesting Officer

EDWARD J. BRENNER
Commissioner of Patents